(12) United States Patent
Mundhenk et al.

(10) Patent No.: US 9,036,910 B1
(45) Date of Patent: May 19, 2015

(54) METHOD AND SYSTEM FOR PROCESSING A SEQUENCE OF IMAGES USING FINGERPRINTS

(71) Applicants: Terrell Nathan Mundhenk, Calabasas, CA (US); Kyungnam Kim, Oak Park, CA (US); Kang-Yu Ni, Calabasas, CA (US)

(72) Inventors: Terrell Nathan Mundhenk, Calabasas, CA (US); Kyungnam Kim, Oak Park, CA (US); Kang-Yu Ni, Calabasas, CA (US)

(73) Assignee: THE BOEING COMPANY, Chicago, IL (US)

( * ) Notice: Subject to any disclaimer, the term of this patent is extended or adjusted under 35 U.S.C. 154(b) by 243 days.

(21) Appl. No.: 13/631,705

(22) Filed: Sep. 28, 2012

(51) Int. Cl.
*G06K 9/00* (2006.01)
*G06T 7/00* (2006.01)

(52) U.S. Cl.
CPC .................................... *G06T 7/0097* (2013.01)

(58) Field of Classification Search
USPC .............. 382/103, 104, 170, 236; 375/240.08
See application file for complete search history.

(56) References Cited

U.S. PATENT DOCUMENTS

| | | | | |
|---|---|---|---|---|
| 7,986,847 B2* | 7/2011 | Kitajima | ...................... | 382/236 |
| 8,116,527 B2 | 2/2012 | Sabol et al. | | |
| 8,369,399 B2* | 2/2013 | Egnal et al. | ............. | 375/240.08 |
| 8,369,574 B2 | 2/2013 | Hu | | |
| 8,811,670 B2 | 8/2014 | Mundhenk et al. | | |
| 2003/0228015 A1 | 12/2003 | Futa et al. | | |
| 2011/0135149 A1 | 6/2011 | Gefen | | |
| 2012/0263346 A1 | 10/2012 | Datta et al. | | |
| 2013/0016877 A1 | 1/2013 | Feris et al. | | |
| 2013/0114857 A1 | 5/2013 | Inaguma et al. | | |

OTHER PUBLICATIONS

Mundhenk et al. ("Detection of unknown targets from aerial camera and extraction of simple object fingerprints for the purpose of target reacquisition," Proc. SPIE 8301, Intelligent Robots and Computer Vision XXIX: Algorithms and Techniques, 83010H, pp. 1-14, (Jan. 23, 2012).*
Comaniciu et al., "Kernal-Based Object Tracking," IEEE Transactions on Pattern Analysis and Machine Intelligence, vol. 25, Issue 5, May 2003, 30 Pages.
Birchfield et al., "Spatiograms Versus Histograms for Region-Based Tracking," IEEE Conference on Computer Vision and Pattern Recognition, Jun. 2005, 6 Pages.
Comaniciu et al., "Mean Shift: A Robust Approach Toward Feature Space Analysis," IEEE Transactions on Pattern Analysis and Machine Intelligence, vol. 24, No. 5, May 2002, pp. 603-619.
Baker et al., "Super-Resolution Optical Flow," Tech. Report CMU-RI-TR-99-36, Robotics Institute, Carnegie Mellon University, Oct. 1999, 14 Pages.
Mundhenk et al., "High Precision Object Segmentation and Tracking for use in Super Resolution Video Reconstruction," Signal Recovery and Synthesis, Jul. 2011, 13 Pages.
Gonzales et al., "Digital Image Processing using MATLAB," second edition, Chapter 1, copyright 2009 by Gatesmark, LLC, 14 Pages.

(Continued)

*Primary Examiner* — Duy M Dang
(74) *Attorney, Agent, or Firm* — Yee & Associates, P.C.

(57) ABSTRACT

A method and system for processing a sequence of images using fingerprints. A current image in the sequence of images is segmented into a plurality of segments. A plurality of segment fingerprints is created for the plurality of segments. Segments in the plurality of segments are fused together using the plurality of segment fingerprints and a set of prior segment fingerprints created for a previous image in the sequence of images to form a set of master segments.

20 Claims, 12 Drawing Sheets

(56) References Cited

OTHER PUBLICATIONS

Thacker et al., "The Bhattacharyya Metric as an Absolute Similarity Measure for Frequency Coded Data," Kybernetika, vol. 34, No. 4, Jan. 1998, 11 Pages.

Prekopcsak et al., "Time Series Classification by Class-Specific Mahalanobis Distance Measures," Advances in Data Analysis and Classification, Jul. 2012, 16 Pages.

Nelder et al., "Generalized Linear Models," Journal of the Royal Statistical Society, Series A (General), vol. 13, No. 3, (1972), pp. 370-384.

Christoudias et al., "Synergism in Low Level Vision," in Proceedings of the 16th International Conference on Pattern Recognition, vol. 4, Aug. 2002, 6 Pages.

McLaren, "The Development of the CIE 1976 (L*a*b*) Uniform Colour Space and Colour-difference Formula," Journal of the Society of Dyers and Colourists, vol. 92, Issue 9, Sep. 1976, pp. 338-341.

Kullback et al., "On Information and Sufficiency," The Annals of Mathematical Statistics, vol. 22, No. 1, Mar. 1951, pp. 79-86.

Yang, "Distance Metric Learning: A Comprehensive Survey," Michigan State University, Department of Computer Science and Engineering, May 2006, 51 Pages.

Fox, "Generalized Linear Models," Chapter 15, Applied Regression Analysis and Generalized Linear Models, 2nd ed. published Apr. 2008 by SAGE Publications, Inc., pp. 379-424.

Notice of Allowance, dated Apr. 25, 2014, regarding U.S Appl. No. 13/631,726, 13 pages.

* cited by examiner

METHOD AND SYSTEM FOR PROCESSING A SEQUENCE OF IMAGES USING FINGERPRINTS

CROSS-REFERENCE TO RELATED APPLICATION

This application is related to the following patent application: entitled "Method and System for Using Fingerprints to Track Moving Objects in Video", Ser. No. 13/631,726, and granted as U.S. Pat. No. 8,811,670 on Aug. 19, 2014; filed even date hereof, assigned to the same assignee, and incorporated herein by reference.

BACKGROUND INFORMATION

1. Field

The present disclosure relates generally to image processing and, in particular, to detecting and tracking moving objects in images. Still more particularly, the present disclosure relates to a system and method for detecting and tracking moving objects in images by creating fingerprints for the moving objects.

2. Background

Different types of techniques are currently available for detecting and tracking moving objects in a sequence of images, such as a video. However, some of these currently available techniques may be unable to detect and/or track a moving object with a desired level of accuracy. For example, some currently available techniques may be unable to detect and/or track a moving object when that moving object becomes partially occluded in one or more images in the sequence of images.

Additionally, some currently available techniques may be unable to determine the contour of a moving object with a desired level of accuracy. As used herein, the contour of an object may be the outline of an object or the shape of the object. This outline may be the outline of the external surface of the object.

Segmentation is an example of one process used to determine the contours of objects in images. As used herein, "segmentation" is the process of dividing an image into multiple segments. Each segment includes a group of pixels that have been identified as sharing a similar visual characteristic. This visual characteristic may be, for example, without limitation, color, texture, intensity, or some other type of characteristic. In this manner, segments that are adjacent to each other are different with respect to the particular visual characteristic beyond some selected threshold.

Segmentation may be used to simplify and/or change the representation of an image such that the segmented image is easier to analyze as compared to the original image. For example, when an image is segmented to form a segmented image, features within the segmented image may be more easily discernible as compared to the original image. In particular, the contours of objects and/or features captured within the original image may be more easily discernible within the segmented image.

However, some currently available segmentation techniques may be unable to segment images in a manner that defines the contour of a single moving object as accurately as desired. For example, when an image is segmented based on color to form a segmented image, an object that is captured in the image as having two or more colors may be represented by multiple segments within the segmented image.

Consequently, the contour of the object within the segmented image may not be as easily discernible as desired. Further, extracting information about the features represented by these types of segments may yield information that is less accurate than desired. Therefore, it would be desirable to have a method and apparatus that takes into account at least some of the issues discussed above, as well as other possible issues.

SUMMARY

In one illustrative embodiment, an image processing system comprises an image segmenter and a fingerprinter. The image segmenter is configured to segment a current image in the sequence of images into a plurality of segments and fuse together segments in the plurality of segments using a plurality of segment fingerprints and a set of prior segment fingerprints created for a previous image in the sequence of images to form a set of master segments. The fingerprinter is configured to create the plurality of segment fingerprints for the plurality of segments.

In another illustrative embodiment, a computer-implemented method for processing a sequence of images using fingerprints is provided. A current image in the sequence of images is segmented into a plurality of segments. A plurality of segment fingerprints is created for the plurality of segments. Segments in the plurality of segments are fused together using the plurality of segment fingerprints and a set of prior segment fingerprints created for a previous image in the sequence of images to form a set of master segments.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that some currently available systems and methods for detecting and tracking objects and, in particular, moving objects, may not perform as well as desired.

In particular, some currently available methods for detecting and tracking objects in video may be unable to track objects, which are at least partially occluded in one or more of the images that form the video, with a desired level of accuracy. Further, these currently available methods may be unable to track objects that temporarily move out of the field of view of the video camera system for some period of time during the video. Still further, some currently available methods for tracking objects may require instructions on which types of objects to search for and track. For example, these methods may be unable to track objects and, in particular, moving objects, without knowing which type of object to detect and track.

Thus, the different illustrative embodiments provide a system and method for generating a fingerprint of a moving object, which has been detected in an image in a sequence of images, for use in detecting and tracking the moving object over the entire sequence of images. In particular, the fingerprint may be used for detecting and tracking the moving object in an image in the sequence of images even when the moving object is partially occluded or no longer in the field of view in the image.

Figure 1:
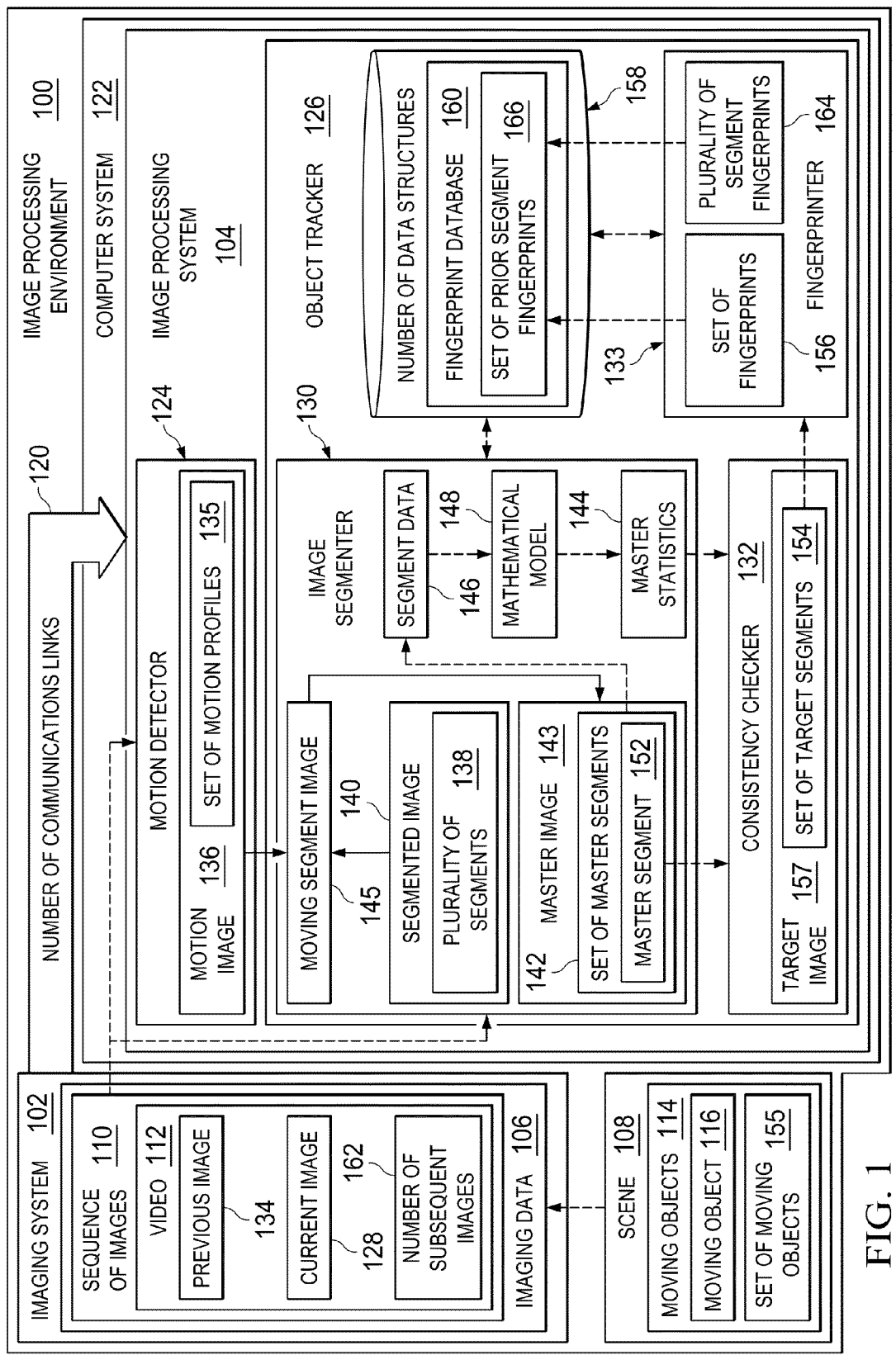
FIG. 1 is an illustration of an image processing environment in the form of a block diagram in which an illustrative embodiment may be implemented.

Referring now to the figures and, in particular, with reference to FIG. 1, an illustration of an image processing environment in the form of a block diagram is depicted in accordance with an illustrative embodiment. In FIG. 1, image processing environment 100 includes imaging system 102 and image processing system 104.

In these illustrative examples, imaging system 102 may be any type of sensor system configured to generate imaging data 106 for scene 108. Imaging system 102 may be selected from, for example, without limitation, an electro-optical (EO) imaging system, an infrared (IR) imaging system, a radar imaging system, a thermal imaging system, an ultrasound imaging system, a light detection and ranging (LIDAR) system, and some other suitable type of imaging system. In this manner, imaging data 106 generated by imaging system 102 may comprise electro-optical images, infrared images, radar images, thermal images, light detection and ranging images, or some other type of images. Electro-optical images may be, for example, visible light images.

In these illustrative examples, imaging data 106 may take the form of sequence of images 110. As used herein, an "image" is a digital two-dimensional image comprising pixels organized into rows and columns. Each pixel may have a value representing a color and/or brightness for that pixel. Further, a "sequence of images", as used herein, is two or more images generated in a consecutive order with respect to time.

Sequence of images 110 generated for scene 108 may be referred to as video 112 of scene 108. When sequence of images 110 is referred to as video 112, each image in sequence of images 110 may be referred to as a "frame".

Scene 108 may be a physical area, such as, for example, without limitation, an area of a city, a neighborhood, an area over an ocean, an area in a forest, an area in a desert, a town, a geographical area, an area inside a manufacturing facility, a floor in a building, a section of highway, or some other suitable type of area.

Moving objects 114 may be present in scene 108. As used herein, a "moving object", such as moving object 116, may be any object that is moving relative to a field of view for imaging system 102. Moving object 116 is an example of one of moving objects 114 in scene 108.

In this manner, moving object 116 may take the form of any object that does not remain stationary within scene 108. For example, moving object 116 may take the form of a person walking or running within scene 108, a vehicle, a mobile structure, an object located on a moving vehicle, or some other suitable type of moving object. A vehicle in scene 108 may take the form of, for example, without limitation, a car, a truck, an aircraft, a van, a tank, an unmanned aerial vehicle, a spaceship, a missile, a rocket, or some other suitable type of vehicle.

In some cases, moving object 116 may be a combination of two or more objects moving together. For example, moving object 116 may comprise two or more objects that are attached to each other and thereby moving together with the same type of motion.

Additionally, moving object 116 may take the form of any object that moves with respect to the field of view for imaging system 102 as the angle at which imaging system 102 is directed and/or as the position of imaging system 102 changes. For example, moving object 116 may be a stationary object that appears to move within sequence of images 110 when imaging system 102 is moved.

Imaging system 102 is configured to send imaging data 106 to image processing system 104 using number of communications links 120. As used herein, a "number of" items means one or more items. In this manner, number of communications links 120 may be one or more communications links. Number of communications links 120 may include at least one of, for example, a wired communications link, a wireless communications link, an optical communications link, and some other type of communications link.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; or some other suitable combination.

Image processing system 104 may be implemented using hardware, software, or a combination of the two. In these illustrative examples, image processing system 104 may be implemented in computer system 122. Computer system 122 may comprise a number of computers. When more than one computer is present in computer system 122, these computers may be in communication with each other.

Image processing system 104 is configured to process imaging data 106 received from imaging system 102. In some illustrative examples, image processing system 104 may receive the images in sequence of images 110 one at a time as the images are generated by imaging system 102. For example, image processing system 104 may receive sequence of images 110 in substantially real-time as the images are generated. In other illustrative examples, image processing system 104 may receive the entire sequence of images 110 at some point in time after sequence of images 110 has been generated.

Image processing system 104 processes sequence of images 110 to detect and track the presence of moving objects in sequence of images 110. As depicted, image processing system 104 includes motion detector 124 and object tracker 126. Motion detector 124 is configured to detect the presence of motion in sequence of images 110. Object tracker 126 is configured to track moving objects over sequence of images 110.

For example, motion detector 124 receives current image 128 in sequence of images 110 for processing. Motion detector 124 is configured to detect motion within current image 128. In one illustrative example, motion detector 124 uses current image 128 and previous image 134 to form motion image 136. Previous image 134 is the image in sequence of images 110 previous to current image 128 without any images between current image 128 and previous image 134. Further, previous image 134 is the image that was previously processed by motion detector 124.

Motion detector 124 uses current image 128 and previous image 134 to identify local motion and global motion in current image 128. As used herein, "global motion" in current image 128 may be an overall motion for current image 128. Global motion may include, for example, the motion of background features in current image 128 relative to the background features in previous image 134. These background features may include, for example, without limitation, trees, sky, roads, bushes, greenery, grass, buildings, manmade structures, and/or other types of background features. In this manner, global motion in current image 128 is the motion of the overall scene 108 relative to the overall scene 108 in previous image 134.

As used herein, "local motion" includes motion that differs from global motion. Local motion may include, for example, the motion of foreground features, such as moving objects 114, in current image 128 relative to previous image 134. Motion detector 124 may subtract the global motion identified in current image 128 from the local motion identified in current image 128 to form motion image 136.

In these illustrative examples, motion image 136 may include set of motion profiles 135. As used herein, a "set of" items may be zero or more items. In other words, a set of items may be a null or empty set. In this manner, in some cases, set of motion profiles 135 may include one, two, three, five, ten, or some other number of motion profiles. In other cases, set of motion profiles 135 may be an empty set.

As used herein, a "motion profile" is a portion of motion image 136 that represents local motion in motion image 136. For example, a motion profile may be a portion of motion image 136 having a color different from a background of motion image 136. This color may represent, for example, a moving object, such as moving object 116 in scene 108.

Object tracker 126 is configured to receive current image 128 and motion image 136 for processing. As depicted, object tracker 126 includes image segmenter 130, number of data structures 158, consistency checker 132, and fingerprinter 133.

Image segmenter 130 is configured to segment, or divide, current image 128 into plurality of segments 138 to form segmented image 140. In these illustrative examples, each segment in plurality of segments 138 includes one or more pixels. When more than one pixel is present in a segment, these pixels are contiguous pixels. In other words, each pixel in the segment is adjacent to another pixel in the segment without any other pixels not belonging to the segment located between these two pixels.

In these illustrative examples, image segmenter 130 segments current image 128 such that all of the pixels in each segment in plurality of segments 138 share a similar visual characteristic. The visual characteristic may be, for example, a color, an intensity value, a texture, or some other type of visual characteristic. For example, all of the pixels in a particular segment in plurality of segments 138 may have a value within a selected range that represents a selected color.

Image segmenter 130 takes into account that different parts of a moving object, such as moving object 116 in scene 108, may have different visual characteristics in current image 128. For example, when moving object 116 is an automobile, the body of the automobile may be appear as one color in current image 128, while the windows of the automobile may appear as another color in current image 128.

Consequently, moving object 116 may be represented in segmented image 140 by multiple segments in plurality of segments 138. Discerning which segments in plurality of segments 138 actually represent moving object 116 may not be easily achieved.

Thus, image segmenter 130 is configured to group segments in plurality of segments 138 together to form set of master segments 142 using motion image 136. In particular, image segmenter 130 fuses together segments in plurality of segments 138 belonging to a same motion profile to form master image 143 having set of master segments 142.

More specifically, segments in plurality of segments 138 that belong to a same motion profile in set of motion profiles 135 in motion image 136 are fused together to form a master segment in set of master segments 142. In these illustrative examples, a segment in plurality of segments 138 may be considered as "belonging" to a particular motion profile in set of motion profiles 135 when the number of pixels in the segment that overlap with the particular motion profile is greater than some selected threshold. Of course, in other illustrative examples, other criteria and/or factors may be used to determine which segments in plurality of segments 138 may be fused together to form set of master segments 142.

In these illustrative examples, image segmenter 130 may only fuse together segments that are contiguous. In other words, two segments in plurality of segments 138 may be fused together only when those two segments are adjacent to each other. In this manner, each master segment in set of master segments 142 comprises a number of contiguous segments.

In some illustrative examples, image segmenter 130 integrates motion image 136 with segmented image 140 to form moving segment image 145. Moving segment image 145 may be created by, for example, without limitation, overlaying motion image 136 over segmented image 140. The portion of segments in plurality of segments 138 overlapped by set of motion profiles 135 may be considered "moving segments."

For each motion profile, the moving segments overlapped by that motion profile are fused together to form a master segment. In this manner, set of master segments 142 may be formed in a number of different ways.

Thereafter, image segmenter 130 generates master statistics 144 for set of master segments 142. As one illustrative example, image segmenter 130 identifies segment data 146 for each master segment in set of master segments 142. Segment data 146 for a particular master segment may include, for example, without limitation, chroma data, luma data, pixel location data, entropy data, and/or other types of data.

Chroma data may include, for example, a chroma value for each pixel in the master segment. The chroma value may be a color value or a saturation value. Luma data may include, for example, a luma value for each pixel in the master segment. The luma value may be a brightness value. Pixel location data may include, for example, a location for each pixel in the master segment with respect to the rows and columns of pixels in master image 143. Entropy data may include chroma data that has been filtered using an entropy filter.

In this illustrative example, image segmenter 130 generates master statistics 144 by fitting segment data 146 to mathematical model 148. In some cases, mathematical model 148 may be a linear regression model, such as, for example, without limitation, a generalized linear model (GLM). The generalized linear model may be, for example, a Gaussian model with full covariance.

Image segmenter 130 sends master image 143 and master statistics 144 to consistency checker 132 for further processing. Consistency checker 132 is configured to determine whether each master segment in set of master segments 142 actually represents a moving object. In other words, consistency checker 132 determines whether a master segment in set of master segments 142 represents a moving object or an image anomaly.

In one illustrative example, consistency checker 132 may match master segment 152 in set of master segments 142 to a previously identified master segment that was identified for previous image 134. Consistency checker 132 determines whether a difference between master statistics 144 for master segment 152 and the master statistics identified for the previously identified master segment is greater than some selected threshold.

If the difference is not greater than the selected threshold, master segment 152 is added to set of target segments 154. In this manner, consistency checker 132 creates set of target segments 154 for current image 128. Set of target segments 154 may include some, none, or all of set of master segments 142.

Each target segment in set of target segments 154 represents a moving object in current image 128. In other words, set of target segments 154 represents set of moving objects 155. Set of moving objects 155 may include some, none, or all of moving objects 114 in scene 108, depending on the implementation. For example, in some cases, set of moving objects 155 may include moving object 116.

In some illustrative examples, consistency checker 132 may be unable to match master segment 152 to a previously identified master segment. In these cases, master segment 152 may be analyzed to determine whether master segment 152 represents an anomaly or a new moving object that was not previously detected. When master segment 152 is identified as representing a new moving object, master segment 152 is added to set of target segments 154. Consistency checker 132 sends set of target segments 154 to fingerprinter 133 as target image 157.

Fingerprinter 133 receives target image 157 and identifies set of fingerprints 156 for set of target segments 154 in target image 157. As used herein, a "fingerprint" for a target segment is a description of the unique features for the moving object represented by that target segment. Set of fingerprints 156 are configured for use in tracking set of moving objects 155 in a number of subsequent images in sequence of images 110.

Fingerprinter 133 stores set of fingerprints 156 in number of data structures 158. A data structure in number of data structures 158 may take the form of, for example, without limitation, a table, a spreadsheet, a chart, a database, a report, an associative memory, or some other type of data structure.

As one illustrative example, set of fingerprints 156 may be stored in fingerprint database 160 in number of data structures 158 for future detection and tracking of moving objects. Fingerprint database 160 includes the fingerprints created for the portion of moving objects 114 in scene 108 detected and tracked within sequence of images 110.

Object tracker 126 may use set of fingerprints 156 stored in fingerprint database 160 to increase the likelihood of being able to track set of moving objects 155 in number of subsequent images 162 in sequence of images 110. In particular, set of fingerprints 156 may be used to track set of moving objects 155 in number of subsequent images 162 even after one or more of these moving objects becomes partially or fully occluded or when one or more of these moving objects moves out of the field of view of imaging system 102. Number of subsequent images 162 may be the images in sequence of images 110 after current image 128.

In these illustrative examples, each fingerprint in set of fingerprints 156 is a lightweight fingerprint. As used herein, a "lightweight fingerprint" is a description of the features for the moving object represented by the corresponding target segment that is minimized with respect to spatial and temporal complexity. In this manner, the amount of storage space needed to store set of fingerprints 156 may be reduced.

In some illustrative examples, image segmenter 130 may use fingerprints to determine which of plurality of segments 138 are to be fused together to form set of master segments 142 in addition to or in place of motion image 136. In one illustrative example, image segmenter 130 sends segmented image 140 to fingerprinter 133. Fingerprinter 133 creates plurality of segment fingerprints 164 for plurality of segments 138 in segmented image 140. Each of plurality of segment fingerprints 164 is a fingerprint for a corresponding segment in plurality of segments 138.

Fingerprinter 133 stores plurality of segment fingerprints 164 in fingerprint database 160 for use by image segmenter. Image segmenter 130 retrieves plurality of segment fingerprints 164 and set of prior segment fingerprints 166 from fingerprint database 160 and uses these different fingerprints to form set of master segments 142.

Set of prior segment fingerprints 166 may include the set of fingerprints previously identified for previous image 134 based on the target segments identified for previous image 134. In this illustrative example, image segmenter 130 groups the contiguous segment fingerprints in plurality of segment fingerprints 164 that match a particular fingerprint in set of prior segment fingerprints 166 together to form a master segment.

Figure 2:
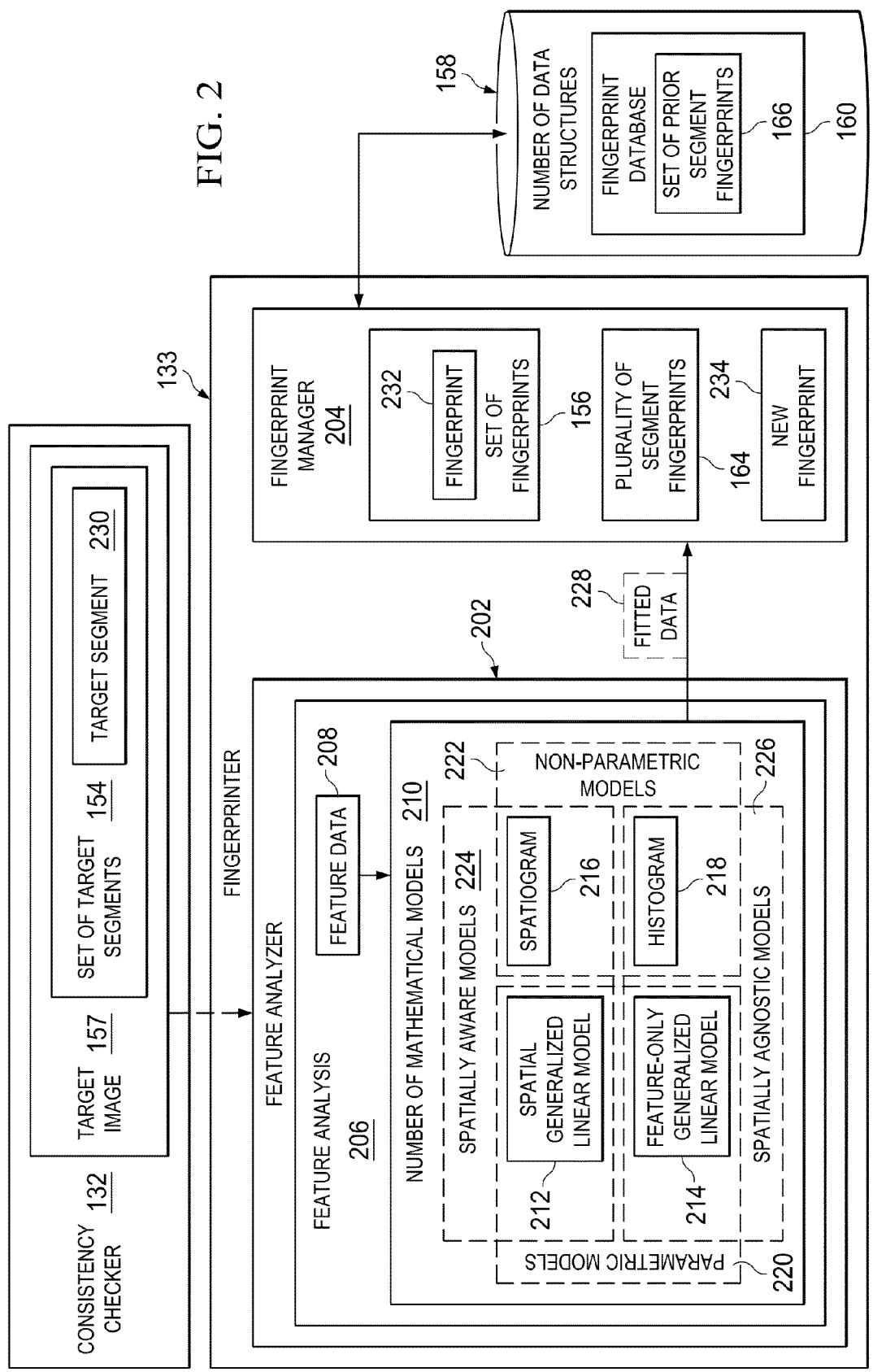
FIG. 2 is an illustration of a fingerprinter in the form of a block diagram in accordance with an illustrative embodiment.

With reference now to FIG. 2, an illustration of a fingerprinter in the form of a block diagram is depicted in accordance with an illustrative embodiment. In FIG. 2, fingerprinter 133 from FIG. 1 is depicted in greater detail.

As depicted, fingerprinter 133 receives target image 157 for processing. Fingerprinter 133 includes feature analyzer 202 and fingerprint manager 204. Feature analyzer 202 is configured to perform feature analysis 206 for each target segment in set of target segments 154 in target image 157 to form set of fingerprints 156. In these illustrative examples, performing feature analysis 206 may include extracting feature data 208 for each target segment in set of target segments 154 and fitting feature data 208 to number of mathematical models 210.

Number of mathematical models 210 may include different types of models. A model in number of mathematical models 210 may be, for example, without limitation, parametric or non-parametric. As used herein, a "parametric model" is a family of distributions that can be described using a finite number of parameters. In contrast, a "non-parametric model," as used herein, does not rely on the data being fitted belonging to any distributions.

Further, a model in number of mathematical models 210 may be, for example, without limitation, spatially aware or spatially agnostic. A spatially aware model may take into account the locations, spatial orientation, and/or alignment of features. However, a spatially agnostic model may not take into account the locations, spatial orientation, or alignment of features.

Spatial generalized linear model 212 and feature-only generalized linear model 214 are examples of parametric models 220. Spatiogram 216 and histogram 218 are examples of non-parametric models 222. Further, spatial generalized linear model 212 and spatiogram 216 are examples of spatially aware models 224. Feature-only generalized linear model 214 and histogram 218 are examples of spatially agnostic models 226.

Feature data 208 for each target segment in set of target segments 154 may be fit to one or more of number of mathematical models 210 to form fitted data 228 for each target segment in set of target segments 154. For example, feature data 208 may fit feature data 208 for target segment 230 in set of target segments 154 to spatial generalized linear model 212, feature-only generalized linear model 214, spatiogram 216, histogram 218, or some combination of the above to form fitted data 228 for target segment 230.

When fingerprinter 133 is configured to create plurality of segment fingerprints 164 as described in FIG. 1, feature data 208 may be extracted for each of plurality of segments 138 in FIG. 1 and fitted to number of mathematical models 210 in a manner similar to the manner described above. In particular, feature data 208 for plurality of segments 138 may be fitted to number of mathematical models 210 to form fitted data 228 for each segment in plurality of segments 138.

Fingerprint manager 204 is configured to receive fitted data 228 for set of target segments 154 and create set of fingerprints 156. Fitted data 228 for each target segment in set of target segments 154 is used to form a fingerprint in set of fingerprints 156. For example, fitted data 228 for target segment 230 is used to form fingerprint 232. In one illustrative example, target segment 230 represents moving object 116 in FIG. 1. Consequently, fingerprint 232 is a fingerprint for moving object 116.

In this manner, set of fingerprints 156 is created for current image 128 in FIG. 1. Fingerprint manager 204 is configured to store set of fingerprints 156 in number of data structures 158 for use in processing number of subsequent images 162 in sequence of images 110 in FIG. 1. For example, set of fingerprints 156 may be stored along with other fingerprints in fingerprint database 160.

When fingerprint manager 204 receives fitted data 228 for plurality of segments 138 in FIG. 1 from feature analyzer 202, fingerprint manager 204 uses fitted data 228 for plurality of segments 138 to create plurality of segment fingerprints 164. Fingerprint manager 204 may store plurality of segment fingerprints 164 in number of data structures 158 and/or send plurality of segment fingerprints 164 to image segmenter 130 in FIG. 1.

During the processing of number of subsequent images 162 in FIG. 1, one or more of set of moving objects 155 in FIG. 1 may become partially occluded or no longer visible. For example, moving object 116 in FIG. 1 may be partially occluded in one or more of number of subsequent images 162. Consequently, moving object 116 may not be detectable in these subsequent images. However, fingerprint 232 for moving object 116 may be used to reacquire the track of moving object 116.

For example, new fingerprints that are created for images after current image 128 in FIG. 1 may be compared to set of fingerprints 156 and any other previously created fingerprints stored in fingerprint database 160. This comparison is used to determine whether any of the new fingerprints are for moving objects for which fingerprints were previously created.

As one illustrative example, one of number of subsequent images 162 in FIG. 1 may be processed and new fingerprint 234 may be created for this subsequent image. In this illustrative example, fingerprint manager 204 compares new fingerprint 234 to the different fingerprints stored in fingerprint database 160 to determine whether new fingerprint 234 is for a moving object for which a fingerprint was previously created.

For example, fingerprint manager 204 may compare new fingerprint 234 with fingerprint 232. If new fingerprint 234 matches fingerprint 232 within selected tolerances, fingerprint manager 204 determines that new fingerprint 234 and fingerprint 232 are for the same moving object, which is moving object 116.

In some illustrative examples, fingerprint manager 204 averages new fingerprint 234 and fingerprint 232 to create a modified fingerprint that replaces fingerprint 232 in fingerprint database 160. In other illustrative examples, fingerprint manager 204 replaces fingerprint 232 with new fingerprint 234 in fingerprint database 160. In this manner, fingerprints may be used to track moving objects and reacquire the tracks of moving objects in sequence of images 110 in FIG. 1.

In some cases, fingerprint manager 204 may be configured to use previously created fingerprints to track stationary objects. For example, in some cases, a moving object for which a fingerprint has been previously created may become stationary during the time over which sequence of images 110 is generated. The previously created fingerprint may be used to keep tracking this object even when the object is not moving.

The illustrations of image processing environment 100 in FIG. 1 and fingerprinter 133 in FIG. 2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, image segmenter 130, consistency checker 132, and fingerprinter 133 may all be part of the same module in some cases. In some illustrative examples, other mathematical models may be used in addition to and/or in place of the models described for number of mathematical models 210 in FIG. 2. In other illustrative examples, consistency checker 132 may be configured to generate master statistics 144 instead of image segmenter 130.

Figure 3:
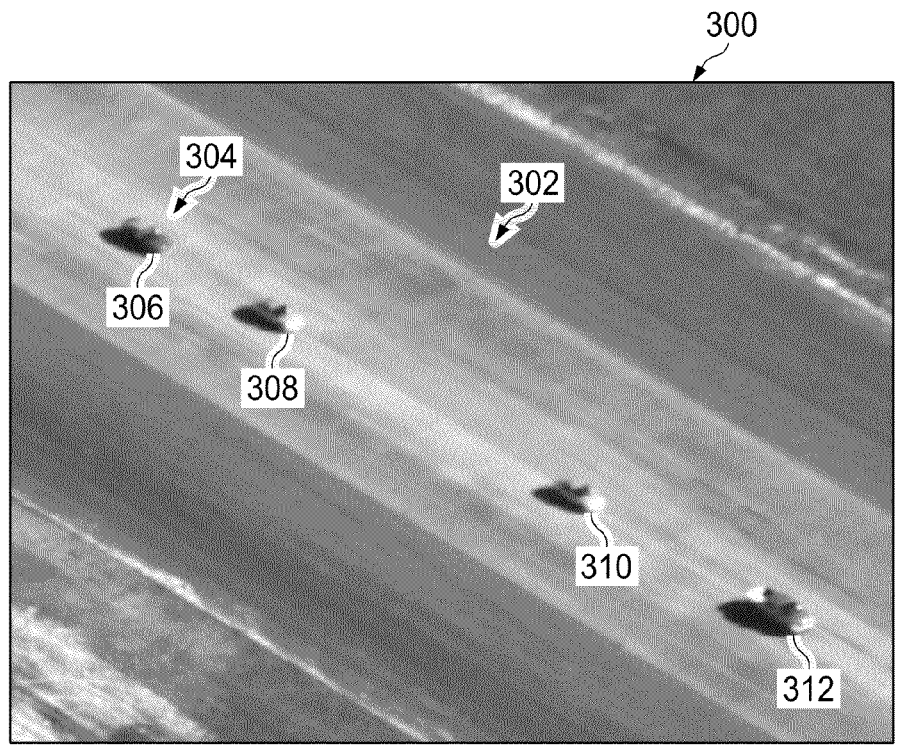
FIG. 3 is an illustration of an image in accordance with an illustrative embodiment.

With reference now to FIG. 3, an illustration of an image is depicted in accordance with an illustrative embodiment. Image 300 is an example of an image that may be generated by an imaging system, such as imaging system 102 in FIG. 1.

In particular, image 300 is an example of one implementation for an image in sequence of images 110 in FIG. 1. Further, image 300 may be an example of one implementation for current image 128 in FIG. 1. As depicted, image 300 includes background 302 and set of moving objects 304. Examples of moving objects in set of moving objects 304 in image 300 include, but are not limited to, vehicles 306, 308, 310, and 312.

Figure 4:
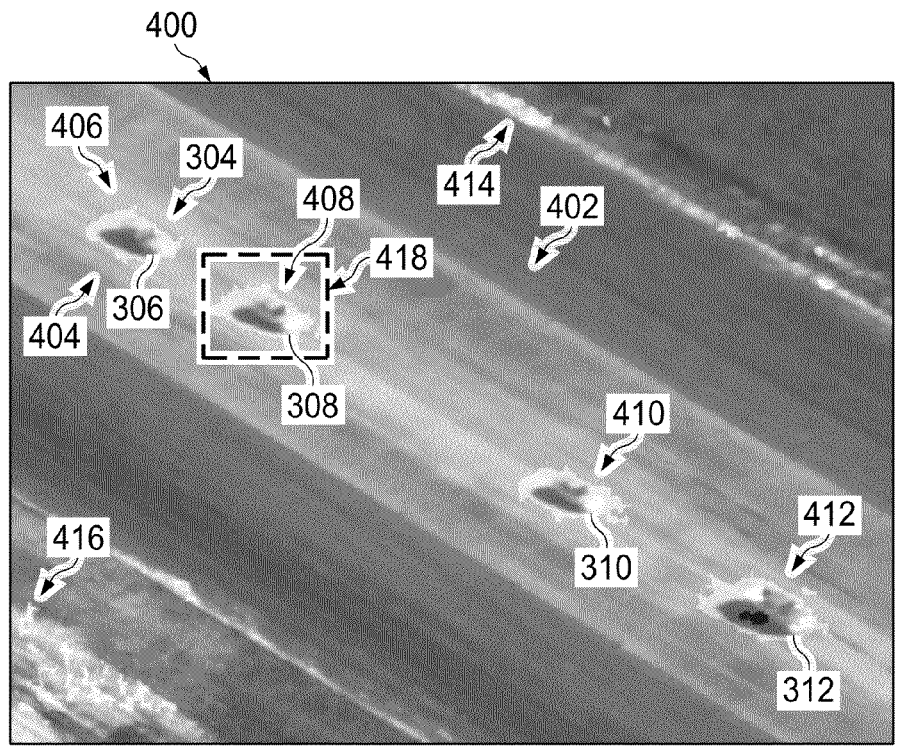
FIG. 4 is an illustration of a motion image in accordance with an illustrative embodiment.

With reference now to FIG. 4, an illustration of a motion image is depicted in accordance with an illustrative embodiment. Motion image 400 is an example of one implementation for motion image 136 in FIG. 1. Image 300 from FIG. 3 may be processed by a motion detector, such as motion detector 124 from FIG. 1, to form motion image 400.

As depicted, motion image 400 includes background 402 and set of motion profiles 404. Further, moving objects 304 from image 300 in FIG. 3 are still visible in motion image 400. Background 402 represents the portion of image 300 contributing to the global motion of image 300 in FIG. 3. The global motion of image 300 may be, for example, the overall motion of the scene in image 300.

Set of motion profiles 404 is an example of one implementation for set of motion profiles 135 in FIG. 1. Each of set of motion profiles 404 represents local motion in image 300 from FIG. 3. Local motion is motion that differs from the global motion of image 300 beyond some selected threshold.

Examples of motion profiles in set of motion profiles 404 include, but are not limited to, motion profiles 406, 408, 410, 412, 414, and 416. In this illustrative example, motion profiles 406, 408, 410, and 412 represent local motion that includes the motion of vehicles 306, 308, 310, and 312, respectively. These motion profiles indicate that the motion of these vehicles is different from the overall motion of the scene captured in image 300 in FIG. 3. Portion 418 of motion image 400 is depicted in greater detail in FIG. 5 below.

Figure 5:
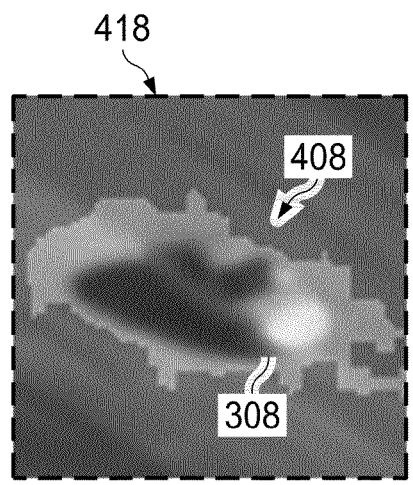
FIG. 5 is an illustration of an enlarged view of a portion of a motion image in accordance with an illustrative embodiment.

Turning now to FIG. 5, an illustration of an enlarged view of portion 418 of motion image 400 from FIG. 4 is depicted in accordance with an illustrative embodiment. As depicted, motion profile 408 is overlaid on top of vehicle 308 in motion image 400. Motion profile 408 represents local motion that includes the motion of vehicle 308. Further, as illustrated, motion profile 408 also represents local motion that includes the shadow of vehicle 308.

Figure 6:
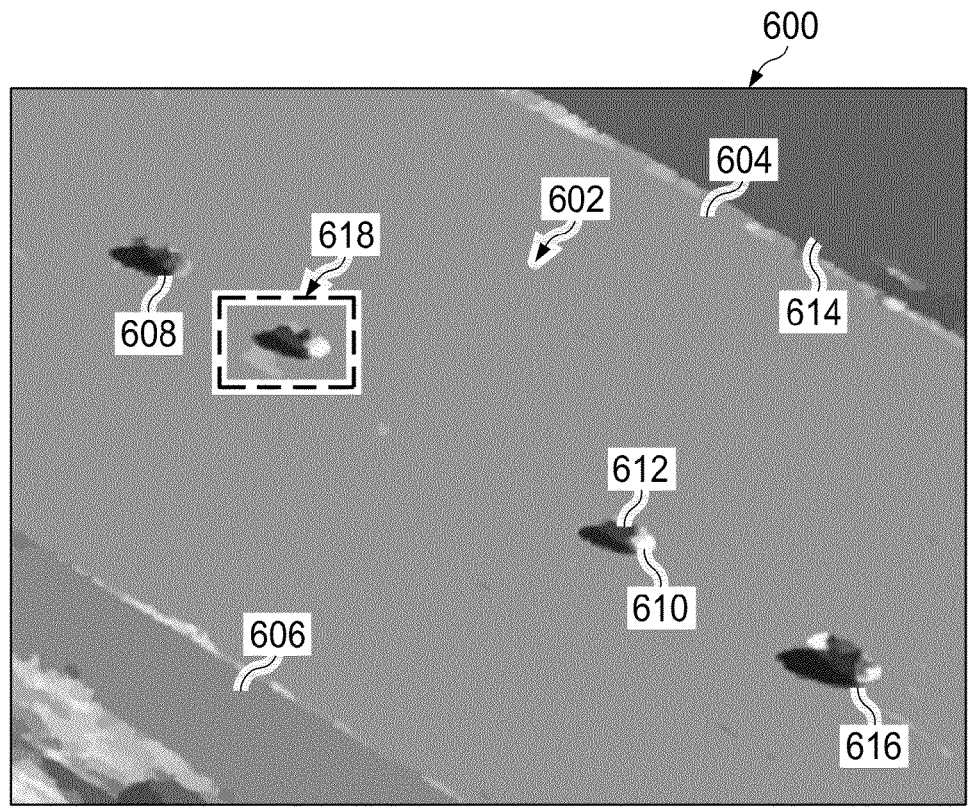
FIG. 6 is an illustration of a segmented image in accordance with an illustrative embodiment.

With reference now to FIG. 6, an illustration of a segmented image is depicted in accordance with an illustrative embodiment. Segmented image 600 is an example of one implementation for segmented image 140 in FIG. 1. Image 300 from FIG. 3 may be processed by, for example, image segmenter 130 in FIG. 1, to form segmented image 600.

As depicted, segmented image 600 includes plurality of segments 602. Plurality of segments 602 is an example of one implementation for plurality of segments 138 in FIG. 1. Each segment in plurality of segments 602 comprises one or more contiguous pixels. The contiguous pixels that form a particular segment in plurality of segments 602 correspond to contiguous pixels in image 300 in FIG. 3 that share a similar visual characteristic. The pixels that form a segment in plurality of segments 602 are all assigned a same value representing that visual characteristic.

Examples of segments in plurality of segments 602 include, but are not limited to, segments 604, 606, 608, 610, 612, 614, and 616. Each of these segments may represent a particular feature in image 300 in FIG. 3. For example, segment 604 represents the road on which vehicles 306, 308, 310, and 312 are traveling in image 300 in FIG. 3. Further, segment 606 and segment 614 represent grass in background 302 in image 300 in FIG. 3.

Segment 608 represents the hood of vehicle 306 in FIG. 3. Segment 610 represents the hood of vehicle 310 in FIG. 3, while segment 612 represents the front window of vehicle 310. Segment 616 represents the shadow cast by vehicle 312 in image 300 in FIG. 3. Portion 618 of segmented image 600 is depicted in greater detail in FIG. 7 below.

Figure 7:
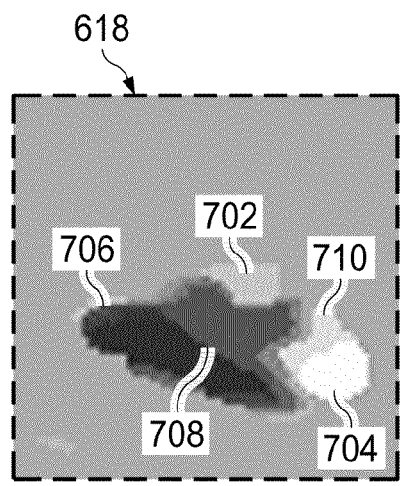
FIG. 7 is an illustration of a portion of a segmented image in accordance with an illustrative embodiment.

Turning now to FIG. 7, an illustration of portion 618 of segmented image 600 is depicted in accordance with an illustrative embodiment. As depicted, segments 702, 704, 706, and 708 in plurality of segments 602 in segmented image 600 are more clearly seen in this view.

Segment 702 represents the top portion of the body of vehicle 308 in image 300 in FIG. 3. Segment 704 represents at least a portion of the hood of vehicle 308 in FIG. 3. Segment 706 represents the shadow cast by vehicle 308 in image 300 in FIG. 3. Further, segment 708 represents the right side doors of vehicle 308 in FIG. 3.

Figure 8:
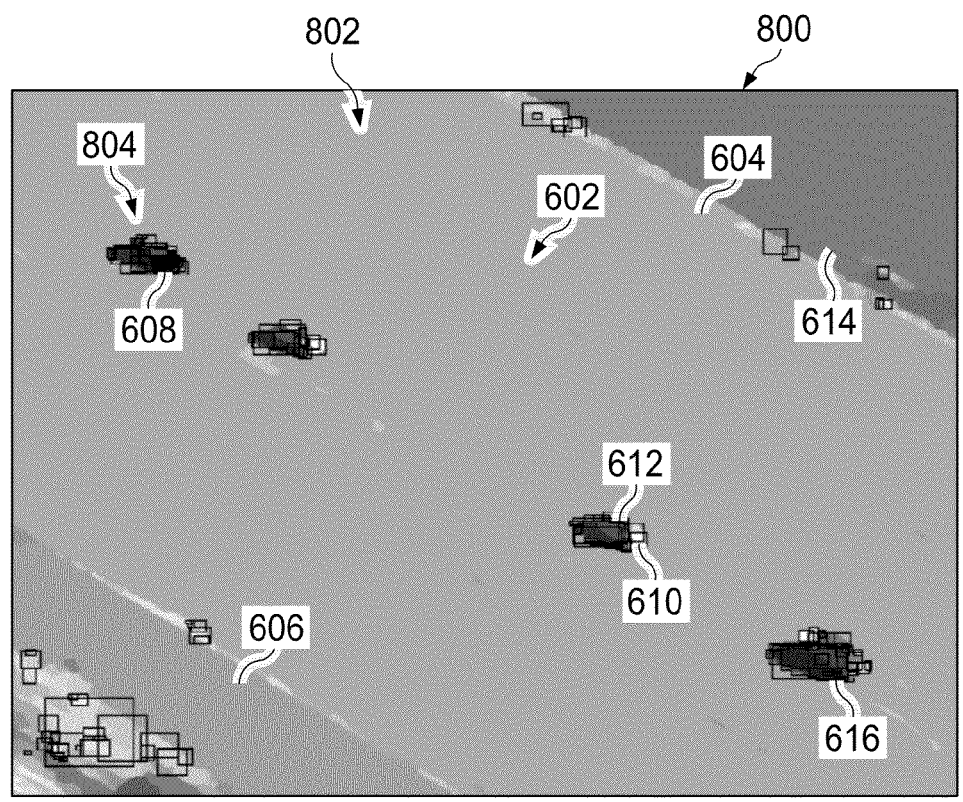
FIG. 8 is an illustration of a moving segment image in accordance with an illustrative embodiment.

With reference now to FIG. 8, an illustration of a moving segment image is depicted in accordance with an illustrative embodiment. In FIG. 8, moving segment image 800 is an example of one implementation for moving segment image 145 in FIG. 1. Motion image 400 from FIG. 4 and segmented image 600 from FIG. 6 have been integrated by, for example, image segmenter 130 in FIG. 1, to form moving segment image 800.

As depicted, moving segment image 800 includes background segments 802 and moving segments 804. Moving segments 804 are those segments from plurality of segments 602 in segmented image 600 in FIG. 6 that are overlapped by set of motion profiles 404 in motion image 400 from FIG. 4. The segments that are overlapped by a same motion profile may be fused together to form a master segment.

Figure 9:
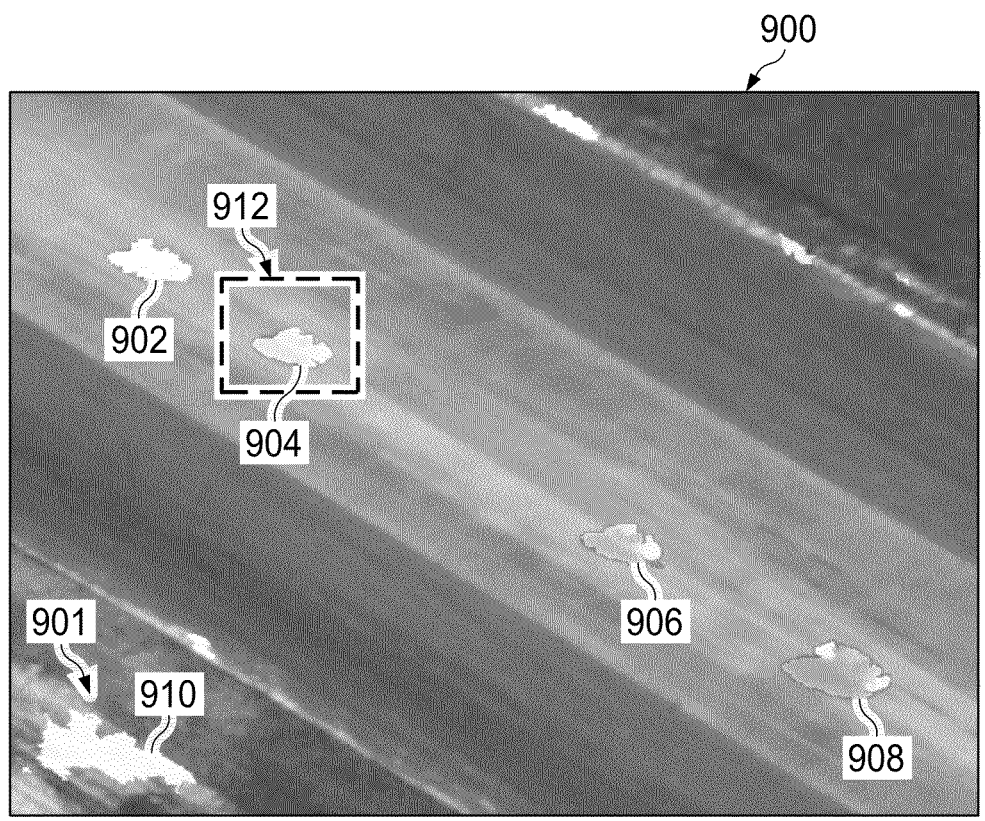
FIG. 9 is an illustration of a master image in accordance with an illustrative embodiment.

With reference now to FIG. 9, an illustration of a master image is depicted in accordance with an illustrative embodiment. Master image 900 is an example of one implementation for master image 143 in FIG. 1. In this illustrative example, moving segments 804 in moving segment image 800 in FIG. 8 that were overlapped by a same motion profile have been fused by, for example, image segmenter 130 in FIG. 1, to form set of master segments 901 in master image 900.

Set of master segments 901 is an example of one implementation for set of master segments 142 in FIG. 1. Examples of master segments in set of master segments 901 include, but are not limited to, master segments 902, 904, 906, 908, and 910. Each of these master segments comprises moving segments from moving segment image 800 in FIG. 8 belonging to a same motion profile in set of motion profiles 404 in FIG. 4. Portion 912 of master image 900 including master segment 904 is depicted in greater detail in FIG. 10 below.

Each master segment in set of master segments 901 may be compared to a set of master segments previously identified for an image processed prior to image 300 in FIG. 3. This comparison may be used to determine whether the master segment actually represents a moving object, some irrelevant feature, or an anomaly.

For example, master segment 902 may be compared to the set of master segments identified for a previous image to determine whether master segment 902 represents a moving object. If master segment 902 does not match any of the previously identified master segments, then an analysis may be performed to determine whether master segment 902 represents a previously undetected moving object, an anomaly, or some other irrelevant feature.

Figure 10:
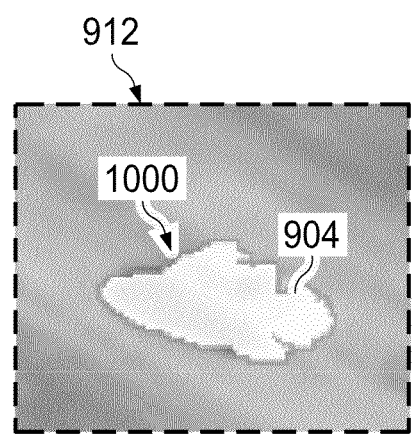
FIG. 10 is an illustration of an enlarged view of a portion of a master image in accordance with an illustrative embodiment.

Turning now to FIG. 10, an illustration of an enlarged view of portion 912 of master image 900 from FIG. 9 is depicted in accordance with an illustrative embodiment. In this illustrative example, master segment 904 has been formed such that contour 1000 of master segment 904 matches the contour of vehicle 308 in image 300 in FIG. 3 within selected tolerances.

Figure 11:
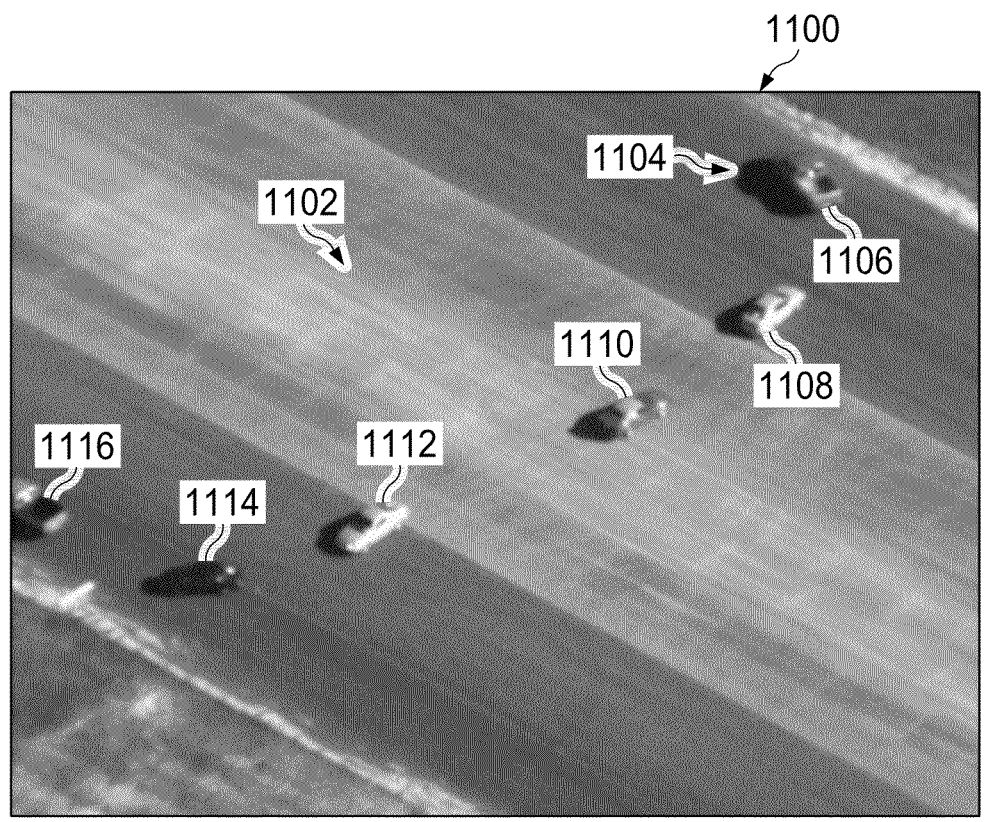
FIG. 11 is an illustration of an image in accordance with an illustrative embodiment.

With reference now to FIG. 11, an illustration of an image is depicted in accordance with an illustrative embodiment. In FIG. 11, image 1100 is an example of an image that may be generated by an imaging system, such as imaging system 102 in FIG. 1.

In particular, image 1100 is an example of one implementation for an image in sequence of images 110 in FIG. 1. Further, image 1100 may be an example of one implementation for current image 128 in FIG. 1. As depicted, image 1100 includes background 1102 and set of moving objects 1104. Examples of moving objects in set of moving objects 1104 in image 1100 include, but are not limited to, vehicles 1106, 1108, 1110, 1112, 1114, and 1116.

Figure 12:
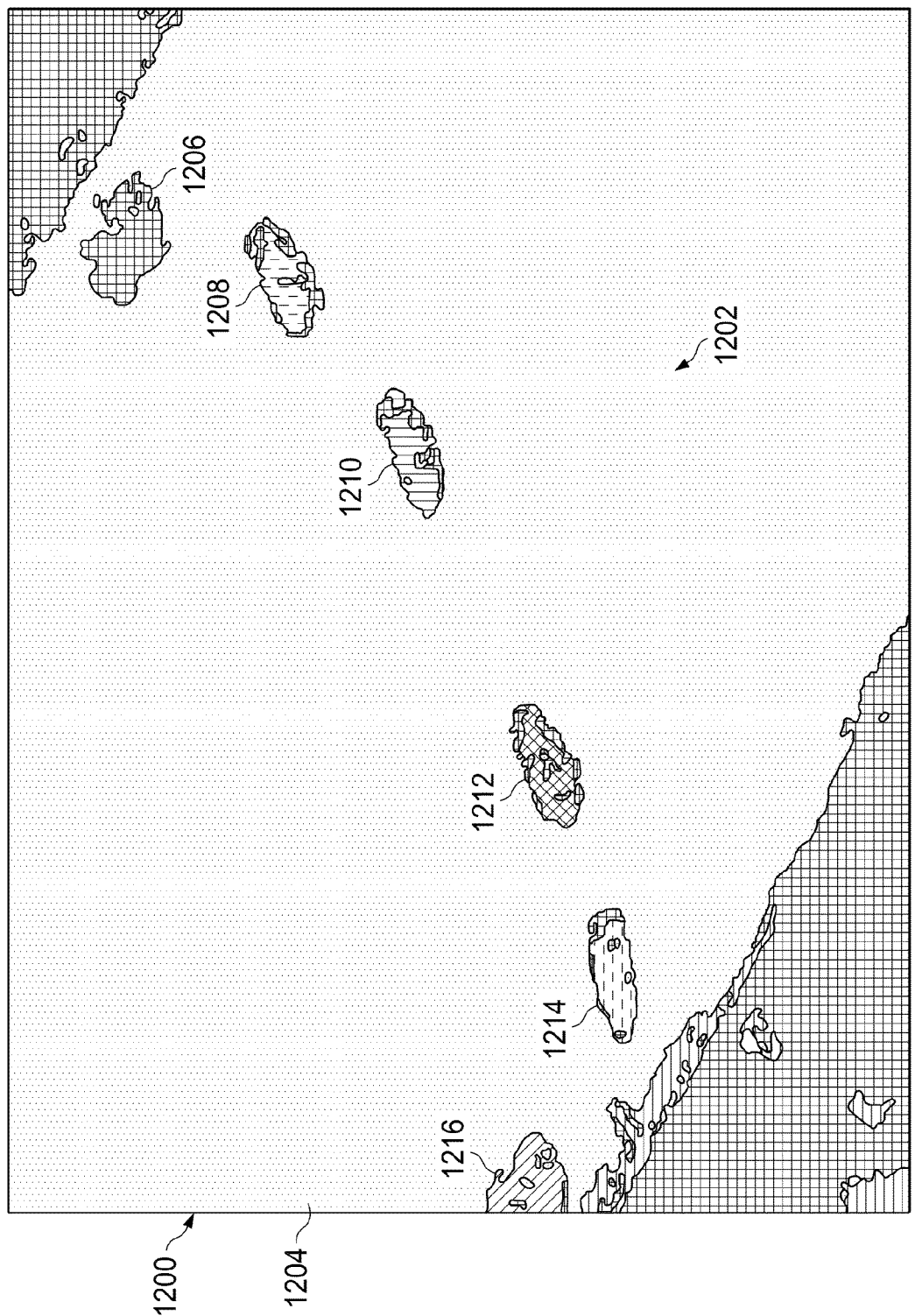
FIG. 12 is an illustration of a master image in accordance with an illustrative embodiment.

With reference now to FIG. 12, an illustration of a master image is depicted in accordance with an illustrative embodiment. Master image 1200 is an example of one implementation for master image 143 in FIG. 1. Image 1100 from FIG. 11 may be processed by object tracker 126 in FIG. 1 to form master image 1200.

As depicted, master image 1200 comprises background segments 1202 and set of master segments 1204. Set of master segments 1204 include master segments 1206, 1208, 1210, 1212, 1214 and 1216. In this illustrative example, master segments 1206, 1208, 1210, 1212, 1214 and 1216 represent vehicles 1106, 1108, 1110, 1112, 1114, and 1116, respectively, from FIG. 11.

Each master segment in set of master segments 1204 was formed by fusing multiple segments from a segmented image together. The selection of which segments to be fused to form set of master segments 1204 was performed using prior fingerprints for an image processed prior to image 1100 in FIG. 11.

Figure 13:
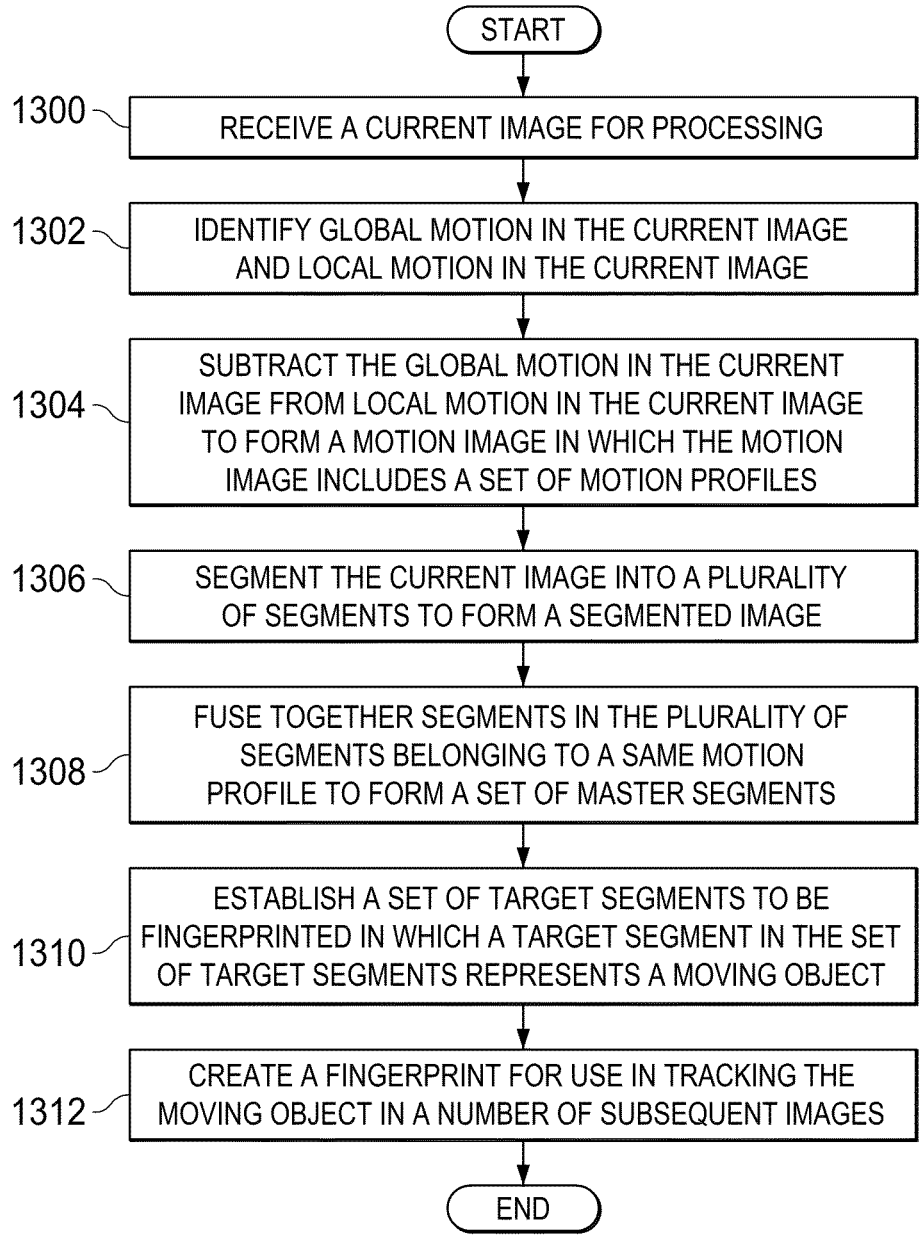
FIG. 13 is an illustration of a process for performing image processing in the form of a flowchart in accordance with an illustrative embodiment.

With reference now to FIG. 13, an illustration of a process for performing image processing in the form of a flowchart is depicted in accordance with an illustrative embodiment. The process illustrated in FIG. 13 may be performed using image processing system 104 in FIG. 1.

The process begins by receiving a current image for processing (operation 1300). The current image may be, for example, current image 128 in FIG. 1. Thereafter, global motion in the current image and local motion in the current image are identified (operation 1302). The global motion in the current image is then subtracted from the local motion in the current image to form a motion image in which the motion image includes a set of motion profiles (operation 1304). Operation 1302 and operation 1304 may be performed using, for example, motion detector 124 in FIG. 1.

Next, the current image is segmented into a plurality of segments to form a segmented image (operation 1306). Operation 1306 may be performed using, for example, image segmenter 130 in FIG. 1. The segments in the plurality of segments belonging to a same motion profile are then fused together to form a set of master segments (operation 1308). Thereafter, a set of target segments to be fingerprinted are established from the set of master segments (operation 1310). In operation 1310, a target segment in the set of target segments represents a moving object.

A fingerprint is then created for each target segment in the set of target segments for use in tracking the moving object in a number of subsequent images (operation 1312), with the process terminating thereafter. Operation 1312 may be performed by, for example, fingerprinter 133 in FIGS. 1-2. The fingerprinter may perform operation 1310 by performing a feature analysis of the master segment.

Figure 14:
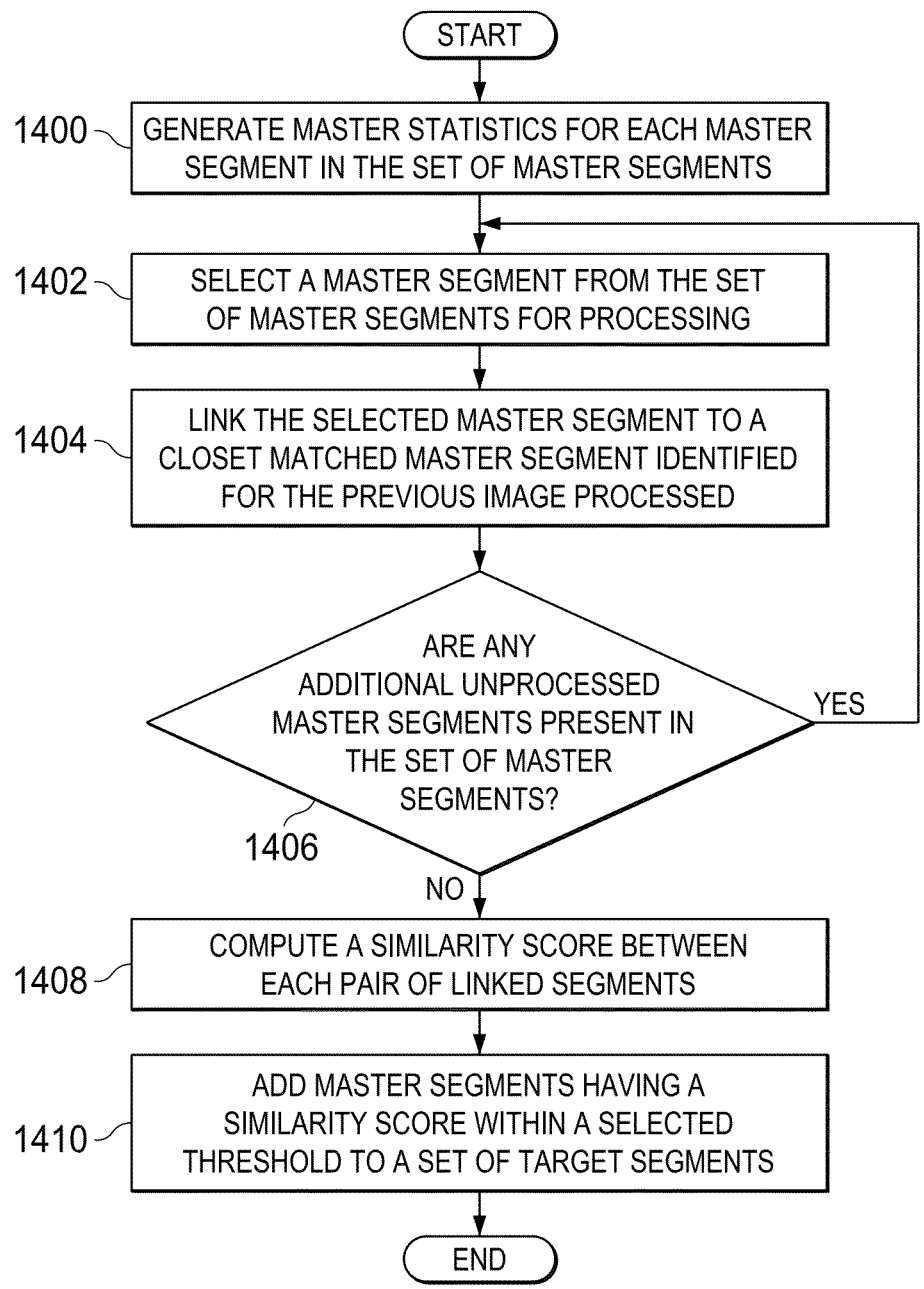
FIG. 14 is an illustration of a process for establishing a set of target segments from a set of master segments in the form of a flowchart in accordance with an illustrative embodiment.

With reference now to FIG. 14, an illustration of a process for establishing a set of target segments from a set of master segments in the form of a flowchart is depicted in accordance with an illustrative embodiment. The process illustrated in FIG. 14 may be an example of one manner in which operation 1310 from FIG. 13 may be performed. This process may be performed by, for example, image segmenter 130 and consistency checker 132 in FIG. 1.

The process begins by generating master statistics for each master segment in the set of master segments (operation 1400). Thereafter, a master segment is selected from the set of master segments for processing (operation 1402).

The selected master segment is linked to a closest matched master segment identified for the previous image processed (operation 1404). The closest matched master segment may be, for example, the previously identified master segment that has a location in the previous image that is closest to the location of the selected master segment within the current image. Of course, in other illustrative examples, the closest matched master segment may be based on the master statistics generated for the selected master segment and the master statistics identified for the set of previously identified master segments for the previous image.

Next, the process determines whether any additional unprocessed master segments are present in the set of master segments (operation 1406). If additional unprocessed master segments are present, the process returns to operation 1402 as described above. Otherwise, the process computes a similarity score between each pair of linked segments (operation 1408). This similarity score may be, for example, without limitation, a Kullback-Leibler (KL) divergence value.

In operation 1408, the similarity score may be computed based on the master statistics identified for the master segments for the current image and for the previously identified master segments for the previous image. In some illustrative examples, the similarity score is computed over a number of images processed previously with respect to the current image.

Thereafter, the master segments having a similarity score within a selected threshold are added to a set of target segments (operation 1410), with the process terminating thereafter. In this manner, only the master segments that are consistent with previously identified master segments are selected as target segments for further processing.

Figure 15:
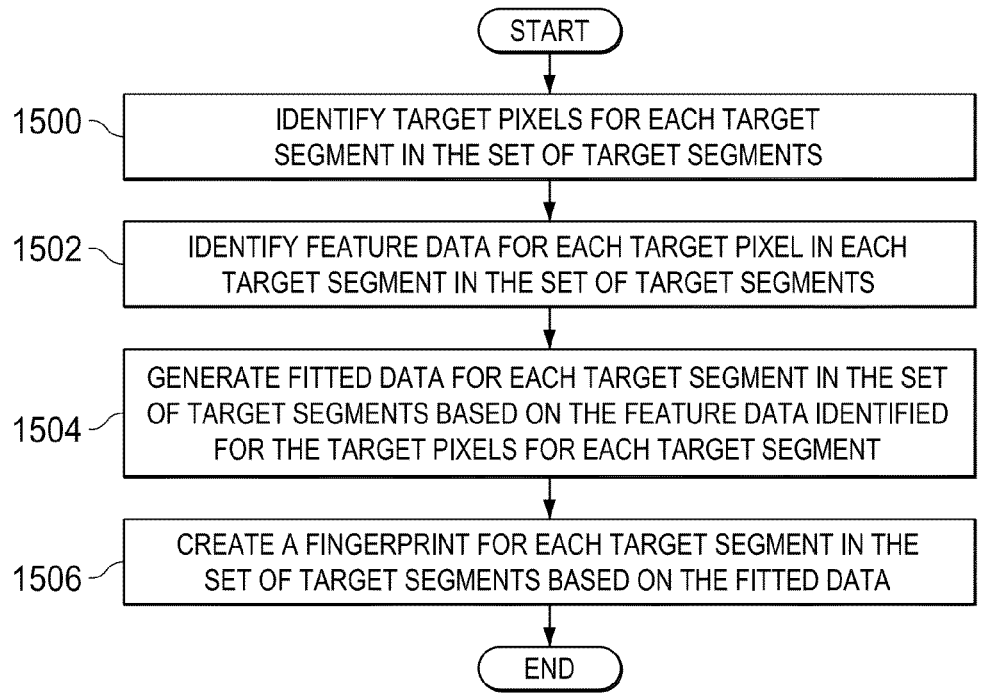
FIG. 15 is a process for creating a fingerprint in the form of a flowchart in accordance with an illustrative embodiment.

With reference now to FIG. 15, an illustration of a process for creating a fingerprint in the form of a flowchart is depicted in accordance with an illustrative embodiment. The process illustrated in FIG. 15 may be an example of one manner in which operation 1312 from FIG. 13 may be implemented. This process may be performed using fingerprinter 133 in FIGS. 1-2.

The process begins by identifying target pixels for each target segment in the set of target segments (operation 1500). A target pixel is a pixel that lies within a target segment. Thereafter, feature data is identified for each target pixel in each target segment in the set of target segments (operation 1502). The feature data for a target pixel may be, for example, a feature vector that includes chroma data, pixel location data, entropy data, other pixel data, or a combination of the above for that target pixel.

Fitted data is then generated for each target segment in the set of target segments based on the feature data generated for the target pixels for each target segment (operation 1504). Next, a fingerprint is created for each target segment in the set of target segments based on the fitted data (operation 1506), with the process terminating thereafter. In operation 1506, a set of fingerprints are created for the set of target segments. These fingerprints are stored for future detection and tracking of moving objects in subsequent images.

Figure 16:
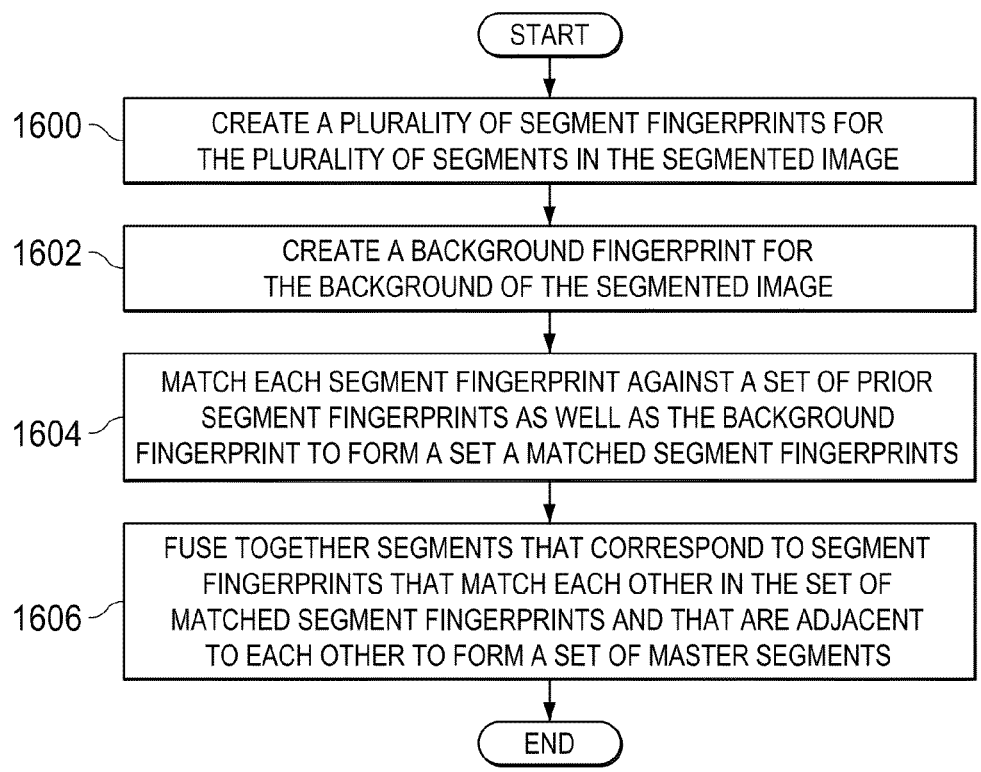
FIG. 16 is an illustration of a process for forming a set of master segments in the form of a flowchart in accordance with an illustrative embodiment.

With reference now to FIG. 16, an illustration of a process for forming a set of master segments in the form of a flowchart is depicted in accordance with an illustrative embodiment. The process illustrated in FIG. 16 may be an example of one manner in which operation 1308 from FIG. 13 may be implemented. This process may be performed using fingerprinter 133 in FIGS. 1-2.

The process begins by creating a plurality of segment fingerprints for the plurality of segments in the segmented image (operation 1600). In operation 1600, a segment fingerprint is created for each segment in the plurality of segments.

In one illustrative example, a Gaussian covariance model may be used to create each segment fingerprint. The model used may be as follows:

$$f(x; \mu, \Sigma) = \frac{1}{(2\pi)^{N/2} \det(\Sigma)^{1/2}} \exp\left[-\frac{1}{2}(x-\mu)\Sigma^{-1}(x-\mu)\right]$$

where $\mu_P$ is the 1×7 matrix mean value over the feature data, $\{a, b, L^e, a^e, b^e, u, v\}$, for each pixel in a segment, P; where $\Sigma_P$ is the 7×7 full covariance matrix over the feature data; where a and b are the chroma components for each pixel and are considered chroma data; where $\epsilon$ is the entropy filtered value; and where u and v are pixel position data. In particular, u is a horizontal position of the pixel within the image and v is the vertical position of the pixel within the image.

In some illustrative examples, not all of the segments in the plurality of segments are fingerprinted. A set of criteria may be used to determine whether a segment in the plurality of segments is fingerprinted. These criteria may include, for example, without limitation, that the number of pixels in the segment is greater than twelve; the feature data for all pixels in a segment is not constant; the segment has a height and width in pixels that is greater than one; the distance in pixels between the edge of the image and the segment is not less than a selected threshold; the segment is less than half the size of the entire image in pixels; and/or other types of criteria.

Thereafter, a background fingerprint is created for the background of the segmented image (operation 1602). In operation 1602, the background of the segmented image may be all portions of the image excluding the plurality of segments. The background fingerprint may also be created using a Gaussian covariance model.

Each segment fingerprint is matched against a set of prior segment fingerprints as well as the background fingerprint to form a set of matched segment fingerprints (operation 1604). In operation 1604, this match may be performed in a number of different ways. For example, a similarity score may be used to perform the matching in operation 1604. In some cases, image registration is used to perform the matching operation 1604.

In one illustrative example, the Kullback-Leibler divergence value between each segment fingerprint and each previously identified segment fingerprint may be computed. Each segment fingerprint that matches to one of the set of prior segment fingerprints with a Kullback-Leibler divergence value below a selected threshold may be added to the set of matched segment fingerprints. Segment fingerprints that match the background fingerprint with a Kullback-Leibler divergence value below a selected threshold may be excluded from the set of matched segment fingerprints.

Thereafter, the process fuses together segments that correspond to segment fingerprints that match each other in the set of matched segment fingerprints and that are adjacent to each other to form a set of master segments (operation 1606), with the process terminating thereafter. For example, in operation 1606, a first segment fingerprint and a second segment fingerprint in the set of matched segment fingerprints that correspond to a first segment and a second segment, respectively, that are adjacent to each other are identified. A determination may be made as to whether a similarity score between the first segment fingerprint and the second segment fingerprint is within a selected threshold.

The first segment and the second segment may be fused together in response to a determination that the similarity score between the first segment fingerprint and the second segment fingerprint is within the selected threshold. In operation 1606, the first segment and the second segment are at least one of fused to form a new master segment to be added to the set of master segments and fused into an existing master segment in the set of master segments.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 17:
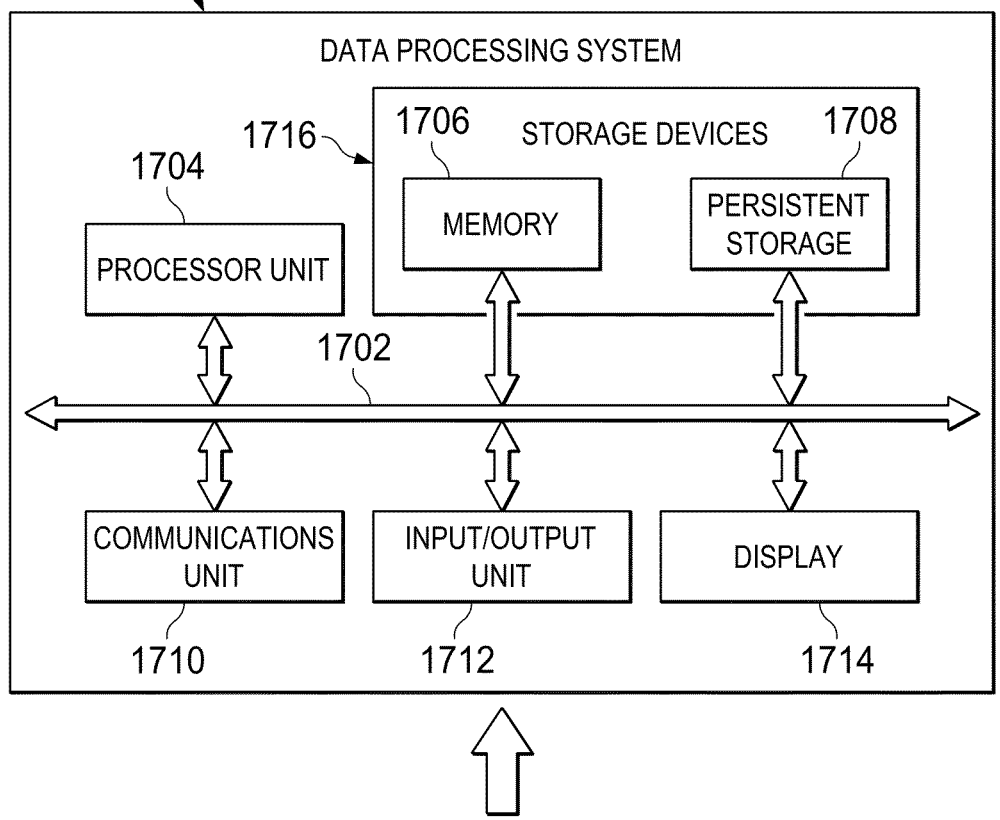
FIG. 17 is an illustration of a data processing system in accordance with an illustrative embodiment.
Figure 17:
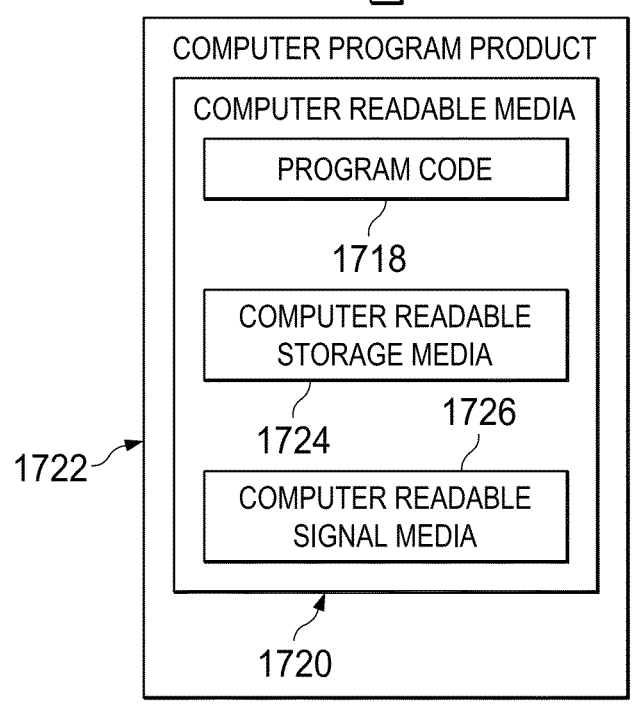

Turning now to FIG. 17, an illustration of a data processing system in the form of a block diagram is depicted in accordance with an illustrative embodiment. In this illustrative example, data processing system 1700 may be used to implement one or more computers in computer system 122 in FIG. 1.

In this illustrative example, data processing system 1700 includes communications framework 1702, which provides communications between processor unit 1704, memory 1706, persistent storage 1708, communications unit 1710, input/output unit 1712, and display 1714. Communications framework 1702 may be implemented as a bus system in some examples.

Processor unit 1704 serves to execute instructions for software that is loaded into memory 1706 to perform a number of operations. Processor unit 1704 may be a number of processors, a multi-processor core, or some other type of processor, depending on the particular implementation. In some cases, processor unit 1704 may take the form of a hardware unit, such as a circuit system, an application specific integrated circuit (ASIC), a programmable logic device, or some other suitable type of hardware.

In some cases, motion detector 124 and/or object tracker 126 from FIG. 1 may be implemented as processors within processor unit 1704. Further, image segmenter 130, consistency checker 132, and fingerprinter 133 from FIG. 1 may be implemented as modules within one or more processors in processor unit 1704.

Memory 1706 and persistent storage 1708 are examples of storage devices 1716. Storage devices 1716 may be in communication with processor unit 1704 through communications framework 1702. A storage device, also referred to as a computer readable storage device, is any piece of hardware capable of storing information such as, for example, without limitation, data, program code in functional form, and/or other suitable information either on a temporary basis and/or a permanent basis. Memory 1706 may be, for example, a random access memory or any other suitable volatile or non-volatile storage device.

Persistent storage 1708 may take various forms and comprise any number of components or devices, depending on the particular implementation. For example, persistent storage 1708 may be a hard drive, a flash memory, a rewritable optical disk, a rewritable magnetic tape, or some combination of the above. Depending on the implementation, the media used by persistent storage 1708 may or may not be removable.

Communications unit 1710, in these examples, provides for communications with other data processing systems or devices. Communications unit 1710 may provide communications through the use of either or both physical and wireless communications links.

Input/output unit 1712 allows for input and output of data with other devices that may be connected to data processing system 1700. For example, input/output unit 1712 may provide a connection for user input through a keyboard, a mouse, and/or some other suitable input device and/or may send output to a printer. Display 1714 provides a mechanism to display information to a user.

Instructions for the operating system, applications, and/or programs may be located in storage devices 1716. The processes of the different embodiments may be performed by processor unit 1704 using computer-implemented instructions. These instructions are referred to as program code, computer usable program code, or computer readable program code and may be read and executed by one or more processors in processor unit 1704.

In these examples, program code 1718 is located in a functional form on computer readable media 1720 that is selectively removable and may be loaded onto or transferred to data processing system 1700 for execution by processor unit 1704. Program code 1718 and computer readable media 1720 form computer program product 1722 in these examples. In some illustrative examples, motion detector 124 and/or object tracker 126 from FIG. 1 may be embodied within computer program product 1722. In some cases, image segmenter 130, consistency checker 132, and fingerprinter 133 from FIG. 1 may be implemented as software modules in program code 1718.

Computer readable media 1720 may take the form of computer readable storage media 1724 or computer readable signal media 1726. Computer readable storage media 1724 is a physical or tangible storage device used to store program code 1718 rather than a medium that propagates or transmits program code 1718. Computer readable storage media 1724 may take the form of, for example, without limitation, an optical or magnetic disk or a persistent storage device that is connected to data processing system 1700.

Alternatively, program code 1718 may be transferred to data processing system 1700 using computer readable signal media 1726. Computer readable signal media 1726 may be, for example, without limitation, a propagated data signal containing program code 1718. This data signal may be an electromagnetic signal, an optical signal, and/or some other suitable type of signal that may be transmitted over communications links that are physical and/or wireless.

The different components illustrated for data processing system 1700 are not meant to provide architectural limitations to the manner in which different embodiments may be implemented. The different illustrative embodiments may be implemented in a data processing system including components in addition to or in place of those illustrated for data processing system 1700.

Other components shown in FIG. 17 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An image processing system comprising:
   an image segmenter configured to segment a current image in a sequence of images into a plurality of segments and fuse together segments in the plurality of segments using a plurality of segment fingerprints and a set of prior segment fingerprints created for a previous image in the sequence of images to form a set of master segments; and
   a fingerprinter configured to create the plurality of segment fingerprints for the plurality of segments.

2. The image processing system of claim 1, wherein the fingerprinter is further configured to identify feature data for each of the plurality of segments, fit the feature data identified for the each of the plurality of segments to a number of mathematical models to generate fitted data, and create the plurality of segment fingerprints using the fitted data.

3. The image processing system of claim 2, wherein the feature data comprises at least one of chroma data, luma data, entropy data, and pixel position data for each pixel in the each of the plurality of segments.

4. The image processing system of claim 2, wherein the number of mathematical models includes at least one of a spatial generalized linear model, a feature-only generalized linear model, a spatiogram, and a histogram.

5. The image processing system of claim 1, wherein the fingerprinter is further configured to create a background fingerprint for a background of the current image.

6. The image processing system of claim 5, wherein the image segmenter is configured to fuse together the segments in the plurality of segments using the plurality of segment fingerprints, the set of prior segment fingerprints created for the previous image in the sequence of images, and the background fingerprint to form the set of master segments.

7. A computer-implemented method for processing a sequence of images using fingerprints, the computer-implemented method comprising:
segmenting a current image in the sequence of images into a plurality of segments;
creating a plurality of segment fingerprints for the plurality of segments; and
fusing together segments in the plurality of segments using the plurality of segment fingerprints and a set of prior segment fingerprints created for a previous image in the sequence of images to form a set of master segments.

8. The computer-implemented method of claim 7, wherein the step of creating the plurality of segment fingerprints for the plurality of segments comprises:
identifying feature data for each of the plurality of segments;
fitting the feature data identified for the each of the plurality of segments to a number of mathematical models to generate fitted data; and
creating the plurality of segment fingerprints using the fitted data.

9. The computer-implemented method of claim 8, wherein the step of identifying the feature data for the each of the plurality of segments comprises:
identifying the feature data for the each of the plurality of segments, wherein the feature data comprises at least one of chroma data, luma data, entropy data, and pixel position data for each pixel in the each of the plurality of segments.

10. The computer-implemented method of claim 8, wherein the step of fitting the feature data identified for the each of the plurality of segments to the number of mathematical models to generate the fitted data comprises:
fitting the feature data identified for the each of the plurality of segments to the number of mathematical models to generate the fitted data, wherein the number of mathematical models includes at least one of a spatial generalized linear model, a feature-only generalized linear model, a spatiogram, and a histogram.

11. The computer-implemented method of claim 7 further comprising:
creating a background fingerprint for a background of the current image.

12. The computer-implemented method of claim 11, wherein the step of fusing together the segments in the plurality of segments using the plurality of segment fingerprints and the set of prior segment fingerprints created for the previous image in the sequence of images to form the set of master segments comprises:
fusing together the segments in the plurality of segments using the plurality of segment fingerprints, the set of prior segment fingerprints created for the previous image in the sequence of images, and the background fingerprint to form the set of master segments.

13. The computer-implemented method of claim 12, wherein the step of fusing together the segments in the plurality of segments using the plurality of segment fingerprints, the set of prior segment fingerprints created for the previous image in the sequence of images, and the background fingerprint to form the set of master segments comprises:
matching each segment fingerprint in the plurality of segment fingerprints to at least one of a prior segment fingerprint in the set of prior segment fingerprints and the background fingerprint based on similarity scores between the plurality of segment fingerprints and the set of prior segment fingerprints and between the plurality of segment fingerprints and the background fingerprint to form a set of matched segments; and
fusing together the segments that correspond to segment fingerprints that match each other in the set of matched segment fingerprints and that are adjacent to each other to form the set of master segments.

14. The computer-implemented method of claim 13, wherein the step of matching the each segment fingerprint in the plurality of segment fingerprints to the at least one of the prior segment fingerprint in the set of prior segment fingerprints and the background fingerprint comprises:
identifying a similarity score between a segment fingerprint in the plurality of segment fingerprints and a prior segment fingerprint in the set of prior segment fingerprints, wherein the segment fingerprint corresponds to a segment in the plurality of segments;
determining whether the similarity score is within a selected threshold; and
adding the segment to the set of matched segments in response to a determination that the similarity score is within the selected threshold.

15. The computer-implemented method of claim 14, wherein the step of identifying the similarity score between the segment fingerprint in the plurality of segment fingerprints and the prior segment fingerprint in the set of prior segment fingerprints comprises:
identifying a Kullback-Leibler divergence value between the segment fingerprint in the plurality of segment fingerprints and the prior segment fingerprint in the set of prior segment fingerprints.

16. The computer-implemented method of claim 13, wherein the step of fusing together the segments that correspond to segment fingerprints that match each other in the set of matched segment fingerprints and that are adjacent to each other to form the set of master segments comprises:
identifying a first segment fingerprint and a second segment fingerprint in the set of matched segment fingerprints corresponding to a first segment and a second segment, respectively, that are adjacent to each other;
determining whether a similarity score between the first segment fingerprint and the second segment fingerprint is within a selected threshold; and
fusing together the first segment and the second segment in response to a determination that the similarity score between the first segment fingerprint and the second segment fingerprint is within the selected threshold, wherein the first segment and the second segment are at least one of fused to form a new master segment to be added to the set of master segments and fused into an existing master segment in the set of master segments.

17. The computer-implemented method of claim 7 further comprising:
identifying a set of target segments from the set of master segments, wherein a target segment in the set of target segments represents a moving object in the current image.

18. The computer-implemented method of claim 7 further comprising:
storing the plurality of segment fingerprints in a fingerprint database for future detection and tracking.

19. The computer-implemented method of claim 7 further comprising:
forming a motion image using the current image, wherein the motion image includes a set of motion profiles.

20. The computer-implemented method of claim 19, wherein the step of fusing together the segments in the plurality of segments using the plurality of segment fingerprints and the set of prior segment fingerprints created for the previous image in the sequence of images to form the set of master segments comprises:

fusing together the segments in the plurality of segments using the plurality of segment fingerprints, the set of prior segment fingerprints created for the previous image in the sequence of images, and the set of motion profiles in the motion image to form the set of master segments.

\* \* \* \* \*